United States Patent

[11] 3,547,469

| [72] | Inventor | Aurelio Sancioni<br>Rte. 1, Box 277, Corning, Calif. 96021 |
|---|---|---|
| [21] | Appl. No. | 740,911 |
| [22] | Filed | June 28, 1968 |
| [45] | Patented | Dec. 15, 1970 |

[54] MOTOR VEHICLE BUMPER WITH TRAILER CONNECTION
6 Claims, 11 Drawing Figs.

[52] U.S. Cl................................................. 280/483,
 293/68, 293/69, 293/86, 224/42.06, 280/500
[51] Int. Cl....................................................... B60d 3/00
[50] Field of Search........................................... 280/484,
 483, 486, 500; 293/69, 68, 85, 86, 73

[56] References Cited
UNITED STATES PATENTS

| 1,740,576 | 12/1929 | Costaganna.................. | 293/86 |
| 2,090,659 | 8/1937 | Zirmer et al.................. | 293/86 |
| 1,863,665 | 6/1932 | Listerman .................... | 293/86 |
| 2,487,496 | 11/1949 | Tyson.......................... | 293/69X |
| 2,584,366 | 2/1952 | Perry........................... | 293/69X |
| 2,890,076 | 6/1959 | Baechler ...................... | 293/68X |

Primary Examiner—Leo Friaglia
Attorney—Alexander B. Blair

ABSTRACT: A motor vehicle bumper having a trailer connection is mounted on the vehicle so as to move longitudinally against resilient resistance to cushion the pull on the trailer and to cushion tendency of the trailer to move toward the motor vehicle when the latter is decelerated. The bumper is mounted to move downwardly vertically in the event the rear end of the vehicle passes over a hump or the trailer passes over a depression in the road, such movement of the bumper also being cushioned. A pair of cylinders have plungers therein connected to said bumper, the movement of which plungers is opposed by springs, and the cylinders are partly braced by a plate extending across and welded thereto and utilized as a spare tire carrier.

PATENTED DEC 15 1970

INVENTOR
Aurelio Sancioni

BY *Alexander B. Blair*

ATTORNEY

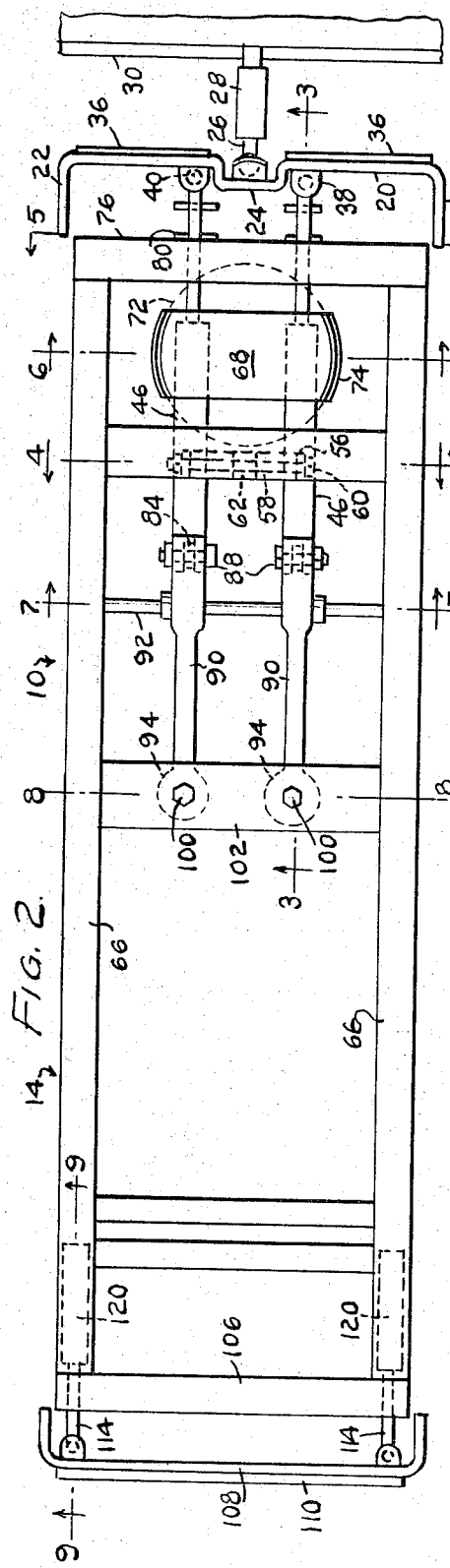
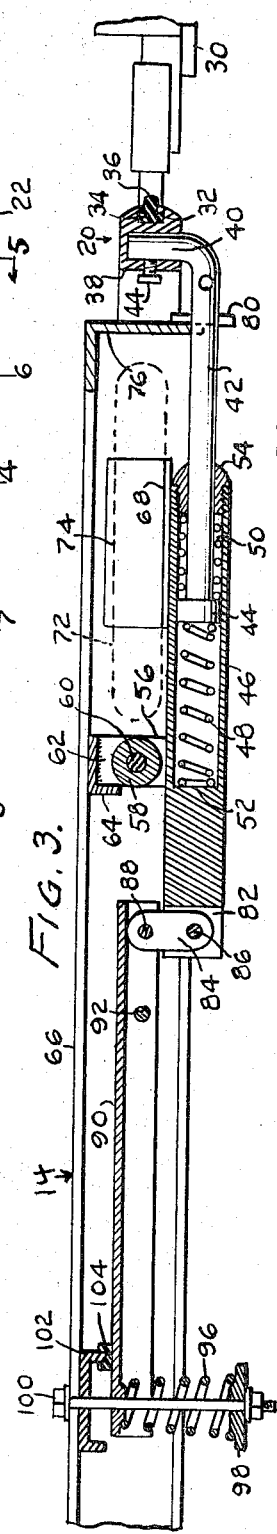
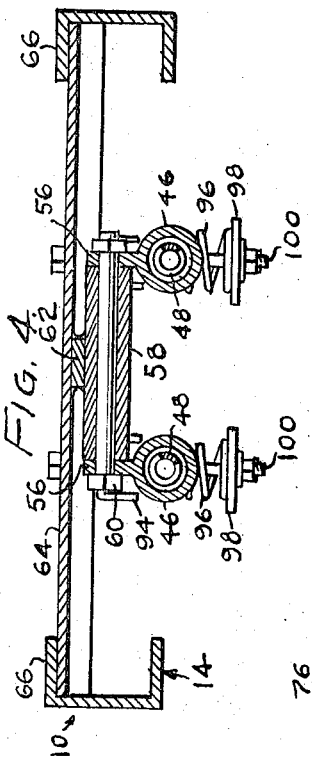
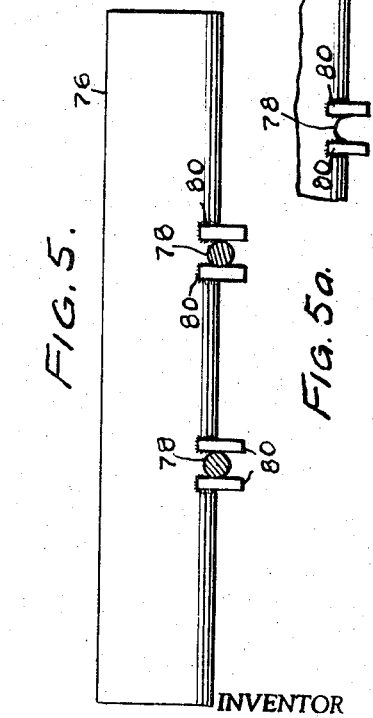
INVENTOR
Aurelio Sancioni
BY
ATTORNEY 3,547,469

MOTOR VEHICLE BUMPER WITH TRAILER CONNECTION

BACKGROUND OF THE INVENTION

Most trailer hitches transmit a positive pull to the trailer when the vehicle is accelerated and a positive retarding force on the motor vehicle when decelerated. The provision of a cushioned longitudinal force in both directions will be helpful in reducing stresses and strains.

Such stresses and strains also occur through relative vertical movement of the rear end of the motor vehicle and the trailer. In my prior U.S. Pat. No. 3,342,509, granted Sept. 19, 1967, I have shown a trailer hitch wherein resilient compensation is made for relative vertical movements of the motor vehicle and trailer, although positive forces are transmitted longitudinally.

SUMMARY OF THE INVENTION

A motor vehicle, usually a truck, is provided with a bumper extending across the rear end thereof and supported by forwardly extending rods terminating in plungers operable in spaced parallel cylinders. Springs are arranged forwardly and rearwardly of the plungers to cushion forward and rear forces of the plungers imparted thereto by relative pushes and pulls longitudinally between the motor vehicle and trailer.

The plunger cylinders are fixed with respect to each other and are mounted to pivot on a transverse axis intermediate their length. The forward ends of the cylinders have link connection with pivoted lever devices mounted to rock when a downwardly force is applied to the bumper, which force causes the cylinders to rock on their pivot axis. Under such conditions the forward ends of the levers move downwardly and such movement is cushioned by compression springs, the lower ends of which are anchored relative to the vehicle frame.

The bumper is provided at opposite sides of the center thereof with resilient cushioned ribs and the trailer connection is arranged centrally of the length of the bumper and offset forwardly to expose the resilient ribs to any impacts which may be subjected directly thereto when a trailer is not connected to the vehicle.

The vehicle is provided with a front bumper also supported by longitudinal rods provided at their rear ends with plungers operable in cylinders and urged forwardly by springs to resiliently oppose impacts against the front bumper.

BRIEF DESCRIPTION OF THE DRAWINGS

FIG. 2 is a plan view of the motor vehicle frame and associated elements, showing the trailer connection and a portion of the front end of the trailer;

FIG. 3 is a vertical longitudinal sectional view on line 3–3 of FIG. 2;

FIG. 4 is a transverse vertical sectional view on line 4–4 of FIG. 2;

FIG. 5 is a similar view on line 5–5 of FIG. 2;

FIG. 5a is a fragmentary face view of a portion of the rear frame of the vehicle shown in FIG. 5 with the bumper supporting rods removed;

DESCRIPTION OF THE PREFERRED EMBODIMENT

Figure 1:
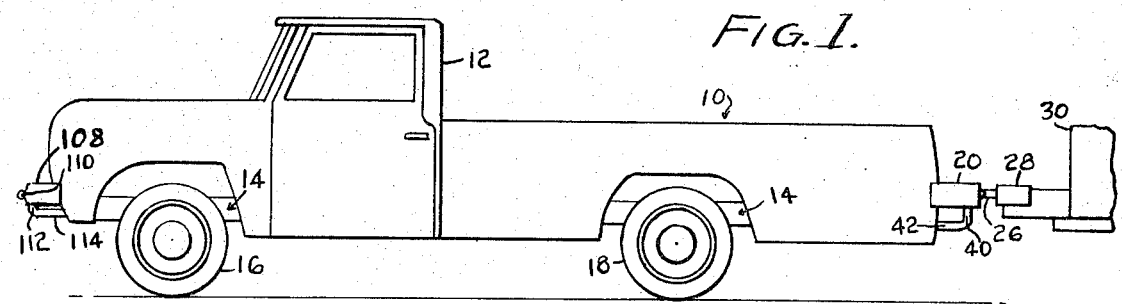
FIG. 1 is a side elevation of a light truck having the invention applied thereto, a portion of the forward end of a trailer being shown.

Referring to FIGS. 1 and 2, the numeral 10 designates a motor vehicle as a whole, shown in the present case as a light truck having the usual cab 12, chassis frame 14, and front and rear wheels 16 and 18, respectively. Rearwardly of the vehicle is arranged a transverse bumper 20, the ends 22 of which turn forwardly outside the limits of the vehicle body. The bumper centrally of its length is offset forwardly as at 24 for the reception of one element 26 of a trailer hitch, the other element 28 of which is detachably connected thereto and connected at its rear end to a trailer 30. The rearwardly offset portions of the bumper 20 are provided with preformed recesses 32 having a cushion element 34 therein provided with a rearwardly extending rib 36 projecting from the bumper to assist in absorbing impacts when the trailer is not connected to the vehicle.

At opposite sides of the center thereof, the bumper 20 is provided with sockets 38 receiving the upturned ends 40 of forwardly extending bumper supporting rods 42. Setscrews 44 secure the ends 40 in the sockets 38. This is merely one type of bumper supporting connection which may be employed and any desired connection for this purpose may be used.

The rods 42 are provided at their forward ends with plungers 44 (FIG. 3) operable in cylinders 46. Springs 48 and 50 are arranged forwardly and rearwardly of each plunger 44 to cushion movement of each plunger in opposite direction longitudinally of the vehicle. Each spring 48 seats at its forward end against the forward extremity 52 of the associated cylinder 46, while each spring 50 seats against a bushing 54 in the rear end of the associated cylinder. Thus both forward and rear movement of the bumper 20 is resiliently resisted.

Intermediate their ends, the cylinders 46 are provided with upstanding ears 56 arranged at opposite ends of a sleeve 58, and a bolt 60 passes through the sleeve 58 and both of the ears 56. Intermediate its ends, the sleeve 58 is provided with an upstanding lug 62 welded thereto and welded to a cross member 64, extending between and welded to the side frame members 66 of the chassis frame 14. The bolt 60 is removable by unscrewing a nut at one end thereof and withdrawing the bolt for a purpose to be described. It will be apparent that the elements just described provide the single pivoting means for both cylinders 46 so that the cylinders may rock on the transverse horizontal axis of the bolt.

The pivot means just described acts as a tie between the cylinders 46 to brace them with respect to each other. Rearwardly of such means, a plate 68 is welded as at 70 to the cylinders 46 and serves to brace the cylinders with respect to each other at their rear ends. This plate is utilized as a carrier for a tire 72 and is provided at its edges transversely of the vehicle with upstanding flanges 74 which prevent movement of the tire transversely of the vehicle. Referring to FIG. 3, it will be noted that the tire is prevented from partaking of substantial movement by the sleeve 58 and from partaking of substantial rearward movement by the transverse vehicle frame member 76 extending across the rear ends of the longitudinal frame members 66.

The frame member 76 is provided with a pair of semicircular notches 78 (FIGS. 5 and 5a) in which the respective rods 42 are normally arranged. These notches permit the rear ends of the rods 42 to move downwardly to swing the cylinders 46 about the pivot axis of the bolt 60. Such action will take place when the rear end of the vehicle passes over a hump or the trailer drops into a depression in the road. To prevent any lateral movement of the rods 42 if they move completely out of their notches 78, guide fingers 80 are welded to the cross members 76, as shown in FIGS. 3, 5 and 5a.

Figure 7:
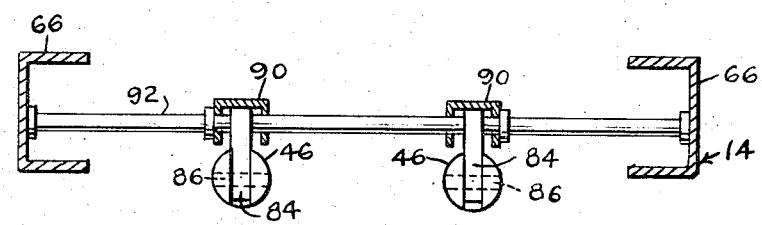
FIG. 7 is a similar view on line 7–7 of FIG. 2.
Figure 8:
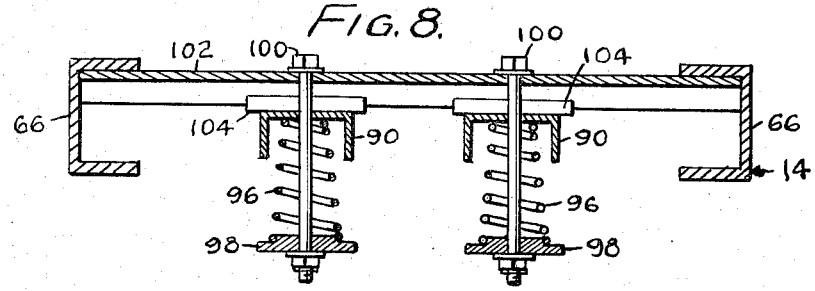
FIG. 8 is a similar view on line 8–8 of FIG. 2.

At their forward ends, the cylinders 46 are vertically slotted as at 82 to receive the lower ends of links 84 pivoted to the cylinders as at 86. The upper end of each link 84 is pivoted as at 88 to a forwardly extending lever 90 which may be of inverted channel section, as shown in FIGS. 7 and 8. This lever is pivoted on a transverse rod 92 (FIG. 7) extending between and fixed to the vehicle side frame members 66. Thus, when the bumper 20 moves downwardly, the links 84 are moved upwardly to impart similar movement to the levers 90, and the forward ends of such levers obviously will move downwardly.

The forward end of each lever 90 has its flanges widened as at 94 (FIG. 2) to receive the upper ends of springs 96, the lower ends of which engage a spring seat 98. The upper end of each spring 96 engages against the bottom of the top face of each lever 90. A bolt 100 connects each spring seat 98 with a transverse member 102 welded or otherwise secured at its ends to the vehicle side frame members 66 (FIG. 8).

The member 102 is provided with depending reinforcing flanges, the right-hand one of which (FIG. 3) is provided with a rubber cushion 104 against which the lever 90 contacts at its forward end in the normal positions of the parts shown in FIG. 3. The springs 96 therefore cushion and resist downward movement of the forward ends of the levers 90 caused by relative downward movement of the bumper 20.

Figure 9:
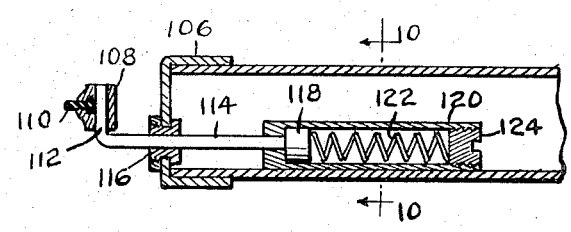
FIG. 9 is a detailed sectional view on line 9–9 of FIG. 2.
Figure 10:
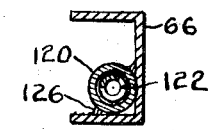
FIG. 10 is a transverse section on line 10–10 of FIG. 9.

The forward ends of the side frame members 66 are connected by a transverse frame member 106, as shown in FIGS. 2 and 9. Forwardly of the frame member 106 is arranged a transverse forward bumper 108 which may have a resilient strip 110 projecting therefrom to cushion impacts against the bumper. The forward bumper may be mounted in the same manner as the rear bumper on the upwardly extending ends 112 of rearwardly extending rods 114 slidable in bushings 116 carried by the frame member 106. The rear end of each rod 114 carries a plunger 118 operating in a cylinder 120 against the resistance of a compression spring 122. The rear end of each cylinder 120 is provided with a plug 124 against which the associated spring 122 seats. Referring to FIG. 10, it will be noted that each cylinder 120 seats against the vertical and lower horizontal flange of the associated frame member 66 and is welded thereto as at 126.

OPERATION

Any impacts against the front end of the vehicle will be partially or wholly absorbed by the rubber rib 110 and by the springs 122 (FIG. 9). The spring pressed mounting of the front bumper thus minimizes any damage to the bumper or forward parts of the vehicle.

When a trailer is connected to the rear end of the vehicle, as in FIGS. 1 and 2, the acceleration of the vehicle does not transmit a direct pull in a positive manner to the trailer. The inertia of the trailer, exerting a pull on the rear bumper will compress the springs 50 (FIG. 3), thus initiating movement of the trailer without destructive pulls thereto which might break or disconnect the trailer hitch. When the motor vehicle is decelerated, the trailer tends to move forwardly toward the vehicle, and here again a positive thrust is eliminated since such movement of the trailer will be cushioned by the springs 48.

If the rear end of the vehicle passes over a hump in the road or the trailer passes over a depression in the road, the rods 42 will move relatively downwardly out of the recesses 78. The cylinders 46, effectively fixed together as a unit, will swing downwardly rearwardly of the pivot bolt 60 and upward movement of the links 84 will transmit similar movement to the rear ends of the levers 90. These levers, at their forward ends, will move downwardly against the compression of the springs 96, thus cushioning the movements referred to. These various cushioning actions save the transmission of sudden solid forces from the motor vehicle and to the trailer, thus minimizing the danger of any damage to the motor vehicle or trailer.

When the trailer is disconnected, the resilient ribs 36 of the rear bumper 20 will tend to cushion any impacts rearwardly of the vehicle and such impacts will be further cushioned by the springs 48 in the cylinders 46. The springs 48 and 50 are normally loaded and balance each other so that the plungers 44 have a normal position as shown in FIG. 3.

Figure 6:
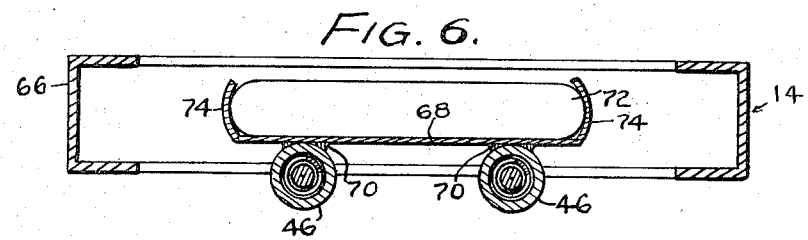
FIG. 6 is a transverse vertical sectional view on line 6–6 of FIG. 2.

It is well known that difficulty is experienced in providing space for a spare tire, particularly in a truck. In the present case, the plate 68 (FIG. 6), welded to the cylinders 46, effectively braces these cylinders and serves as a spare tire carrier. The tire will be limited in its horizontal movements in all directions and will be limited in its upward movement by the floor of the vehicle.

When it is desired to remove this spare tire, the bolt 60 (FIG. 4) will be removed, whereupon the bumper 20 and rods 42 drop downwardly. The plate 68 also drops downwardly and the tire can be removed rearwardly from beneath the cross frame member 76. Thus, provision is made for supporting the spare tire without sacrificing any of the truck space or mounting the tire externally of the vehicle.

From the foregoing it will now be seen that there is herein provided an improved motor vehicle bumper with trailer connection which accomplishes all of the objects of this invention and others, including many advantages of great practical utility and commercial importance.

As various embodiments may be made of this inventive concept, and as many modifications may be made in the embodiment hereinbefore shown and described, it is to be understood that all matter herein is to be interpreted merely as illustrative, and not in a limiting sense.

I Claim:

1. In combination with a motor vehicle having a chassis frame and forward and rear ends, a bumper arranged adjacent and extending across the rear end of the vehicle, means including resilient devices supporting said bumper for movement toward and away from the vehicle, resilient means holding said bumper in a normal position from which it is vertically displaceable, said means for resiliently supporting said bumper for movement toward and away from the vehicle comprising a pair of cylinders each having a plunger therein, said cylinders being fixed to each other and mounted to turn on a transverse horizontal axis, said resilient means for holding said bumper in a normal position comprising spring means for opposing swinging movement of said cylinders about said transverse horizontal axis, said means for opposing swinging movement of said cylinders about said transverse horizontal axis comprising a lever forwardly of each cylinder, a link connecting the rear end of each lever to the forward end of the corresponding cylinder, spring means for opposing vertical movement in one direction of the other end of each lever, and pivot means extending horizontally transversely of the vehicle and fixed to said chassis frame and supporting said levers for turning movement.

2. In combination with a motor vehicle having a chassis frame and forward and rear ends, a bumper arranged adjacent and extending across the rear end of the vehicle, means including a pair of cylinders supporting said bumper for movement toward and away from the vehicle, resilient means holding said bumper in a normal position from which it is vertically displaceable, an elongated transverse bearing sleeve fixed with respect to said chassis frame, a bolt passing through said sleeve and pivotally connecting said cylinders thereto for swinging movement on a transverse horizontal axis, said sleeve being arranged forwardly of the rear ends of said cylinders, and means for resiliently opposing upward movement of the rear ends of said cylinders and hence downward movement of said bumper.

3. The combination defined in claim 2 wherein said means for opposing upward movement of the rear ends of said cylinders comprises a lever extending horizontally forwardly with respect to each of said cylinders, means for mounting said levers for pivoting movement on a transverse horizontal axis between the ends of said levers, a link pivotally connecting the forward end of each cylinder with the rear end of each lever, and means for resiliently opposing downward movement of the forward end of each lever.

4. The combination defined in claim 2 wherein said sleeve and its connections with said cylinders fix the latter against movement toward and away from each other, and a spare tire supporting plate extending across and fixed to the forward ends of said cylinders, the removal of said bolt from said sleeve permitting said bumper, said plunger rods and said cylinders to swing downwardly rearwardly of the vehicle for the removal of the tire from said spare tire plate.

5. In combination with a motor vehicle having a chassis frame and forward and rear ends, a bumper arranged adjacent and extending across the rear end of the vehicle, means including resilient devices supporting said bumper for movement toward and away from the vehicle, resilient means holding said bumper in a normal position from which it is vertically displaceable, said means for resiliently supporting said bumper for movement toward and away from the vehicle comprising a pair of cylinders each having a plunger therein, a spring in each end of said cylinders engaging the adjacent end of the plunger therein to oppose longitudinal movement of said plunger in either direction, each plunger having a rod connnected to and supporting said bumper, said chassis frame comprising a transverse frame member at the rear end of said chassis frame, and a plunger mounted in each cylinder and having a rearwardly extending rod connected at its rear end to said bumper, said means for opposing movement of said bumper toward and away from the vehicle comprising a pair of springs in each cylinder arranged respectively forwardly and rearwardly of and engaging the associated plunger, each plunger rod engaging the bottom of said transverse frame member to limit upward movement of said bumper, said transverse frame member being provided with a pair of vertical guides arranged at each side of said plunger rod to permit downward movement of the latter without transverse movement.

6. In combination with a motor vehicle having a chassis frame and forward and rear ends, a bumper arranged adjacent and extending across the rear end of the vehicle, means including resilient devices supporting said bumper for movement toward and away from the vehicle, resilient means holding said bumper in a normal position from which it is vertically displaceable, said means for resiliently supporting said bumper for movement toward and away from the vehicle comprising a pair of cylinders each having a plunger therein, a spring in each end of said cylinders engaging the adjacent end of the plunger therein to oppose longitudinal movement of said plunger in either direction, each plunger having a rod connected to and supporting said bumper, said chassis frame comprising a transverse frame member at the rear end of said chassis frame, and a plunger mounted in each cylinder and having a rearwardly extending rod connected at its rear end to said bumper, said means for opposing movement of said bumper toward and away from the vehicle comprising a pair of springs in each cylinder arranged respectively forwardly and rearwardly of and engaging the associated plunger, each plunger rod engaging the bottom of said transverse frame member to limit upward movement of said bumper, said bumper being provided centrally thereof with a trailer hitch, said transverse frame member being provided with a downwardly opening notch in which each plunger rod is normally arranged, and vertical guides carried by said transverse member at each side of each notch to guide each plunger rod for vertical movement when relative vertical movement occurs between the rear end of said vehicle and a trailer connected to said trailer hitch.